(12) United States Patent
Yew et al.

(10) Patent No.: US 12,088,900 B2
(45) Date of Patent: Sep. 10, 2024

(54) METHOD OF EMBEDDING AN IMAGING DEVICE WITHIN A DISPLAY

(71) Applicant: Continental Automotive GmbH, Hannover (DE)

(72) Inventors: Carel Suat Fun Yew, Singapore (SG); Kah Soon Ang, Singapore (SG); Swee Yoong Foo, Singapore (SG); Ma Ella Preciosa Cruz Yap, Singapore (SG)

(73) Assignee: Continental Automotive GmbH, Hannover (DE)

( * ) Notice: Subject to any disclaimer, the term of this patent is extended or adjusted under 35 U.S.C. 154(b) by 186 days.

(21) Appl. No.: 17/621,048

(22) PCT Filed: Jul. 8, 2020

(86) PCT No.: PCT/EP2020/069219
§ 371 (c)(1),
(2) Date: Dec. 20, 2021

(87) PCT Pub. No.: WO2021/008959
PCT Pub. Date: Jan. 21, 2021

(65) Prior Publication Data
US 2022/0345597 A1  Oct. 27, 2022

(30) Foreign Application Priority Data
Jul. 12, 2019 (GB) .................................. 1909999

(51) Int. Cl.
*H04N 23/55* (2023.01)
*B60K 35/60* (2024.01)
(Continued)

(52) U.S. Cl.
CPC ............. *H04N 23/55* (2023.01); *B60K 35/60* (2024.01); *G02F 1/13312* (2021.01);
(Continued)

(58) Field of Classification Search
CPC ........ H04N 23/55; H04N 7/144; H04N 23/57; B60K 37/02; B60K 2370/21;
(Continued)

(56) References Cited

U.S. PATENT DOCUMENTS

| 7,417,781 B2 | 8/2008 | Tonar et al. |
| 7,535,468 B2 | 5/2009 | Uy |

(Continued)

FOREIGN PATENT DOCUMENTS

| EP | 3187923 A1 | 7/2017 |
| GB | 2558774 A | 7/2018 |
| WO | 2018196149 A1 | 11/2018 |

OTHER PUBLICATIONS

International Search Report and Written Opinion for International Application No. PCT/EP2020/069219, mailed Oct. 21, 2020, 9 pages.

*Primary Examiner* — Nhan T Tran
(74) *Attorney, Agent, or Firm* — Buchanan Ingersoll & Rooney PC

(57) ABSTRACT

A display unit including a liquid crystal layer, a plurality of optical layers and an imaging device. The imaging device is aligned to a portion of the display unit, the portion configured to transmit more than 10% of light rays to the imaging device. A method of assembling the same is also provided.

16 Claims, 6 Drawing Sheets

(51) Int. Cl.
   *G02F 1/133* (2006.01)
   *G02F 1/1335* (2006.01)
   *H04N 7/14* (2006.01)

(52) U.S. Cl.
   CPC ....... *G02F 1/133509* (2013.01); *H04N 7/144* (2013.01); *B60K 2360/21* (2024.01); *B60K 2360/84* (2024.01); *G02F 2203/11* (2013.01)

(58) Field of Classification Search
   CPC ............. B60K 2370/84; G02F 1/13312; G02F 1/133509; G02F 2203/11; G02F 1/13338; G02F 1/1335; H01L 27/146
   See application file for complete search history.

(56) References Cited

U.S. PATENT DOCUMENTS

| | | |
|---|---|---|
| 8,345,129 B2 | 1/2013 | Kanade et al. |
| 9,143,668 B2 | 9/2015 | Mathew et al. |
| 9,570,019 B2 | 2/2017 | Musgrave et al. |
| 11,048,294 B2 | 6/2021 | Yin et al. |
| 2007/0002130 A1 | 1/2007 | Hartkop |
| 2012/0006669 A1 | 1/2012 | Bronshtein et al. |
| 2014/0063407 A1 | 3/2014 | Kwon et al. |
| 2016/0161664 A1* | 6/2016 | Ishida .................. G02B 6/0045 359/230 |
| 2016/0358543 A1 | 12/2016 | Rappoport et al. |
| 2017/0123452 A1* | 5/2017 | Evans, V ............ G02F 1/13338 |
| 2019/0157337 A1 | 5/2019 | Lin et al. |
| 2020/0117034 A1* | 4/2020 | Yin .................. G02F 1/136209 |

\* cited by examiner

METHOD OF EMBEDDING AN IMAGING DEVICE WITHIN A DISPLAY

CROSS REFERENCE TO RELATED APPLICATIONS

This application is the U.S. National Phase Application of PCT International Application No. PCT/EP2020/069219, filed Jul. 8, 2020, which claims priority to Great Britain Patent Application No. 1909999.3, filed Jul. 12, 2019, the contents of such applications being incorporated by reference herein.

FIELD OF THE INVENTION

This disclosure relates to a method of embedding an imaging device within a display module.

BACKGROUND OF THE INVENTION

Driver's monitoring is often being used to support other vehicular functions, for example, to trigger vehicle safety warnings or autonomous driving functions. To achieve driver's monitoring, an imaging device is used to capture images of the driver's facial features, to determine state of drivers. Within an interior of a vehicle cabin, locations that are able to capture images of full facial features of a driver is limited and therefore, it is extremely challenging to find a suitable location to place the imaging device. Example of suitable locations will be around the cockpit area, for instance located at a rear-view mirror, within an instrument panel or a display unit.

To solve the problem of space constraints, one possible solution is to embed a camera within a display unit.

However, embedding a camera within a display unit leads to another problem, i.e. insufficiency of light rays from ambient reaching the camera. When there are insufficient light rays reaching the camera, the quality and resolution of images captured is poor and the driver's monitoring function may become inaccurate.

SUMMARY OF THE INVENTION

A purpose of this disclosure is to solve the problem of space constraints within an interior of a vehicle cabin, for the purpose of selecting a position of an imaging device to, amongst others, capture image(s) of a driver for driver's monitoring function.

Another purpose of this disclosure is to provide a solution to the problem of insufficient light rays reaching the imaging device, which compromises accuracy of driver's monitoring functions due to poor quality of image(s) captured.

Yet another purpose of this disclosure is to maintain the quality of image displayed on display units, despite having an imaging device embedded within the display unit.

According to a first aspect of this disclosure, a display unit is provided. The display unit comprises a liquid crystal layer, a plurality of optical layers and an imaging device, wherein the imaging device is at least partially embedded within the plurality of optical layers and aligned to a portion of the display unit, the portion configured to transmit more than 10% of light rays to the imaging device.

The portion may comprise an optically transparent substance configured to transmit light rays within a visible and infrared regions.

The light rays transmitted may have a wavelength within an infrared region.

The imaging device may be arranged within any layer of the display unit or external of any layer of the display unit.

The imaging device may be arranged within the plurality of optical layers.

The plurality of optical layers may be arranged between the liquid crystal layer and the imaging device.

The imaging device may be arranged at least partially within the portion or entirely within the portion.

According to a second aspect of this disclosure, a method of assembling a display unit is provided. The method comprises: providing a liquid crystal layer (202), a plurality of optical layers and an imaging device aligned to a portion of the display unit; and configuring the portion to transmit more than 10% of light rays to the imaging device.

The configuring the portion of the display unit may further comprise injecting an optically transparent substance into the liquid crystal layer such that more than 10% of light rays passes through the optically transparent substance.

The optically transparent substance is configured to transmit light rays within a visible and infrared regions.

The optically transparent substance is configured to transmit light rays within an infrared region.

The configuring the portion of the display unit may further comprise placing a plurality of spacers within the liquid crystal layer, for partitioning the optically transparent substance from the liquid crystal layer.

The configuring the portion may further comprise providing a cavity in the plurality of optical layers such that more than 10% of light rays passes through the cavity and the optically transparent substance.

The configuring the portion may further comprise arranging the imaging device and the optically transparent substance entirely within the portion such that more than 10% of light rays passes through the optically transparent substance.

Advantageously, the purpose of solving the problem of space constraints within an interior of a vehicle cabin is achieved by positioning an imaging device within a display unit in an interior of a passenger cabin, which does not suffer from insufficiency of light rays to the imaging device.

Advantageously, the purpose of solving the problem of insufficient light rays reaching the imaging device, thus compromising quality of image(s) captured is solved by configuring a portion of the display unit to transmit more than 10% of light rays to the imaging device positioned within the display unit, without additional steps of cutting a light modulating layer of the display unit, or bleaching any portion of the display. This disclosure provides the ability for imaging devices that are embedded within or under a liquid crystal layer to capture clearer image(s), which could otherwise be unclear or hazy. Advantageously, quality of image(s) captured by the imaging device ensures accuracy of driver's monitoring function.

BRIEF DESCRIPTION OF DRAWINGS

Other aspects will become apparent from the following description of embodiments with reference to the accompany drawings in which:

FIG. 2A shows a side view of a display module 200a.

DETAILED DESCRIPTION OF EMBODIMENT

Hereinafter, an explanation of this disclosure will be discussed in detail, with reference to the drawings.

The term "configured to" may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of" carrying out a function.

The term "couple", "coupled", "coupling" and its grammatical variation thereof may denote a connection of at least two components, using electrical means, for example electrical connection, optical link, electromagnetic induction, electrostatic charge or any suitable electrical connection means.

The term "align", "aligned", "aligning" and its grammatical variation thereof may denote an arrangement of two or more objects in a straight line or in relative positions. With reference to the disclosure, the term "aligning" may denote aligning a part of the imaging device, for example an aperture of the imaging device may be aligned to a portion of a liquid crystal layer.

Figure 1:
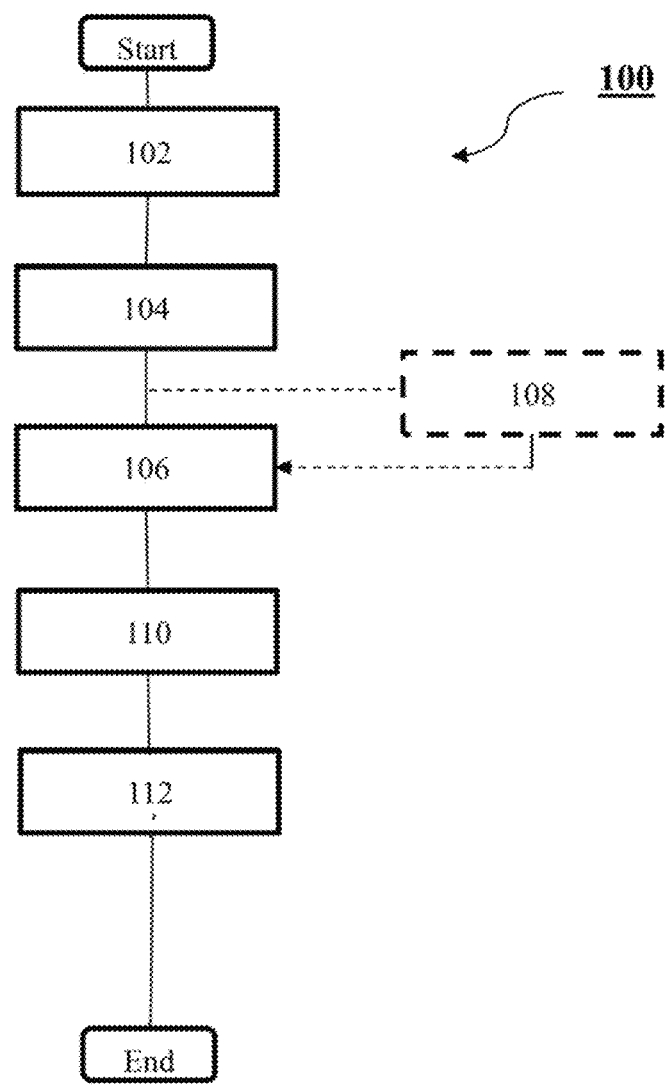
FIG. 1 shows a flowchart illustrating a method for assembling a display unit in accordance to an exemplary embodiment.

With reference to the drawings, FIG. 1 shows a flowchart 100 illustrating a method of assembling a display unit in accordance to an embodiment as disclosed herein. In step 102, a liquid crystal layer 202, a plurality of optical layers 200b and an imaging device 304 is provided. The imaging device 304 is aligned to a portion of the display unit in step 104. In step 106, a portion 204 of the liquid crystal layer 202 as provided in step 102 is configured to transmit more than 10% of light rays to the imaging device 304. The portion 204 is constructed by injecting an optically transparent substance 214 to a layer of light modulating substance such as liquid crystals deposited on to a substrate 212.

In optional step 108, a plurality of spacers 206, 206' is placed within the light modulating substance. Examples of suitable spacers 206, 206' may be fibre, beads or inserts made of plastic or glass which are cost efficient and readily available. The placement of spacers 206, 206' defines an outline of the portion 204, keeping the portion 204 in shape until the optically transparent substance 214 sets or hardens. Before the optically transparent substance 214 sets or hardens, spacers 206, 206' may also serve to partition the optically transparent substance 214 from the light modulating substance. Additionally, placement of spacers 206, 206' defines a thickness of the light modulating substances on the substrate 212. However, placement of spacers does not achieve uniformity at all times. As such, additional step of polishing may be required to ensure a smooth surface. It shall be appreciated that optional step 108 may be omitted without departing from the scope and spirit of this disclosure.

In step 110, the display module 200a (FIG. 2a referred) is coupled with a plurality of optical layers 200b. Optical layers helps to characterise appearance of images displayed on the display unit, through efficient modulation of light rays radiating from back of the display layer towards the ambient environment. The plurality of optical or optoelectronic layers 200b comprises one or more polarizer and optical film (FIG. 2b referred).

In the step 112, a light source or backlight 222 is coupled with the plurality of optical layers 200b. An additional light guide 220 may be included for modulating light rays towards the plurality of optical layers 200b. The light source 222 may include a slit 226, configured for receiving an electrical circuitry 302 to power up the imaging device 304.

Figure 2A:
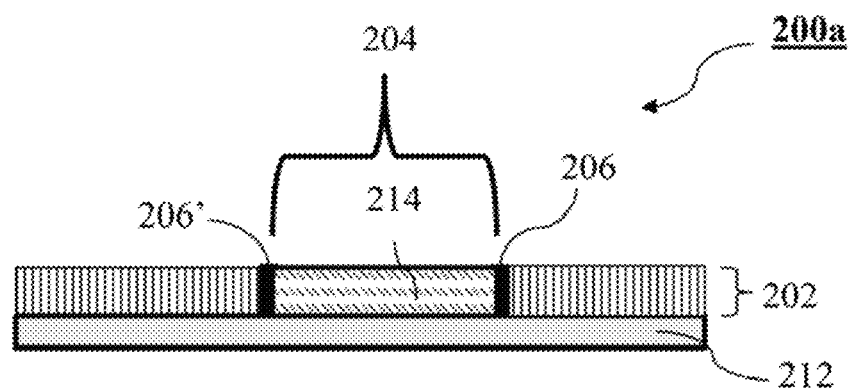
Figure 2B:
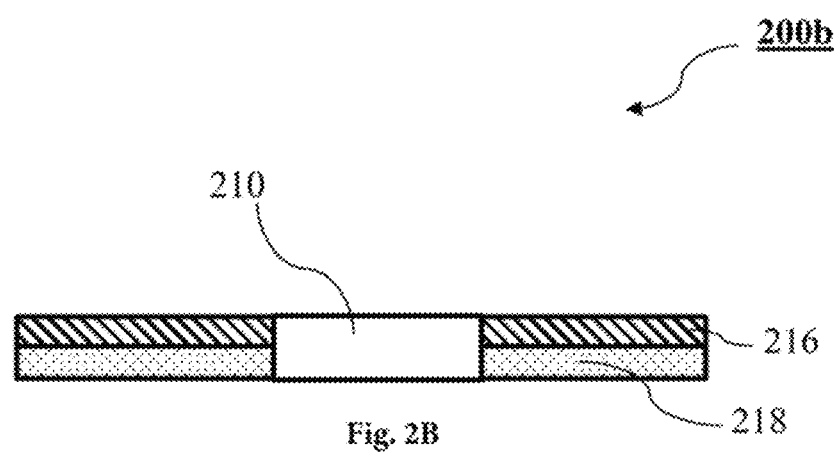
FIG. 2B shows a side view of a plurality of optical layers 200b.

Turning to FIG. 2A, which shows a display module 200a in accordance to an embodiment disclosed herein, the display module 200a comprises of a light modulating layer 202. The light modulating layer may be a liquid crystal layer 202, which modulates light through the light modulating layer 202 for displaying images. The display module 200a further comprises a substrate 212. The substrate 212 may be a glass substrate, for example a thin film transistor (TFT) glass treated for fabricating displays. A portion 204 is configured so that light rays can be transmitted through the portion 204. The portion comprises of an optically transparent substance 214. The liquid crystal layer 202 may further include a plurality of spacers 206, 206' for separating the optically transparent substance 214 from the liquid crystals. An optically transparent substance 214 may be an optically clear resin (OCR), which may be in solid or liquid state. An example of an optically transparent resin is an optical elastomeric resin. The optically transparent substance 214 is operable to receive light rays within both visible and infrared region. Once the optically transparent substance 214 is set or hardened, a transparent portion 204 is formed. This transparent portion 204 allows transmitting more than 10% of light rays to propagate through the portion 204, towards the subsequent layers of the display unit.

Alternatively, the optically transparent substance 214 may be doped with infrared pass pigment, to achieve configuring a portion 204 with characteristics of propagating light rays in an infrared region. Yet alternatively, a filter cover 228 may be coated with an infrared filter ink 234, to achieve characteristics of propagating light rays within an infrared region to the imaging device 304. For purpose of this disclosure, a 100% transparency level refers to the transmission of all light waves within the visible and infrared regions through the optically transparent substance and a 0% transparency level refers to an opaque substance.

Light spectrum in the visible and infrared spectrum is a combination from 400-700 nm (visible light) to 700-1000 nm (infrared). The portion 204 is configured to allow more than 10% of light rays from the aforesaid region to propagate through the portion 204 to at least a next layer of the display unit. In an exemplary embodiment, an infrared filter cover or a filter cover coated with an infrared filtering ink is used in the cover layer. As such, more than 10% of light rays between 700-1000 nm propagates through the portion 204 to at least the next layer of the display unit. If the imaging device requires application for receiving light spectrum outside the range of visible and infrared range, the same concept may also apply without departing from the scope and spirit of this disclosure.

FIG. 2B shows a plurality of optical layers 200b in accordance to an exemplary embodiment. Optical layers characterise the appearance of images displayed on the display unit through efficient modulation of light rays radiating from back of the display layer towards the ambient environment. The plurality of optical or optoelectronic layers 200b may include one or more polarizer layer 216 and optical film 218, as shown in FIG. 2b, depending on desired design specification. For indoor applications such as displays within an interior of a vehicle cabin, coupling the plurality of optical layers 200b to a display layer 200a, such as a liquid crystals layer 202 shown in FIG. 2a is necessary to achieve a transmissive or transflective display.

Figure 2C:
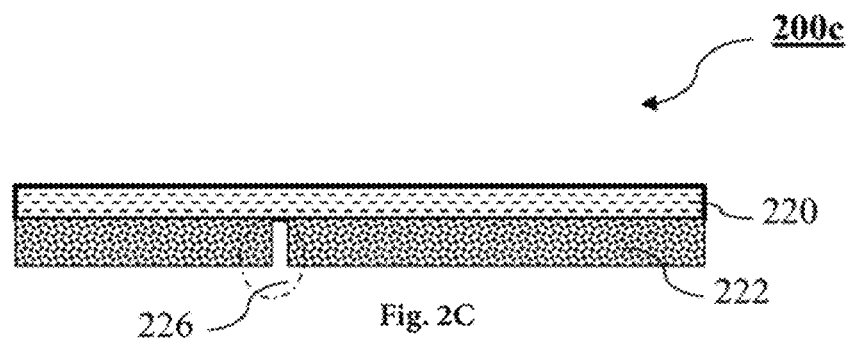
FIG. 2C shows a side view of a light source arrangement 200c.

FIG. 2C shows a light source arrangement 200c in accordance to an exemplary embodiment, which may be coupled to optical layers 200b. The light source arrangement 200c includes a light guide 220 and light source or backlight 222. The light guide 220 achieves the function of modulating and guiding light rays from the light source 222 towards the plurality of optical layers 200b and eventually to the liquid crystal layer 202 for displaying images. The light source 222 may include a slit 226, for receiving an electrical circuitry for supplying current to power up the display unit.

Figure 2D:
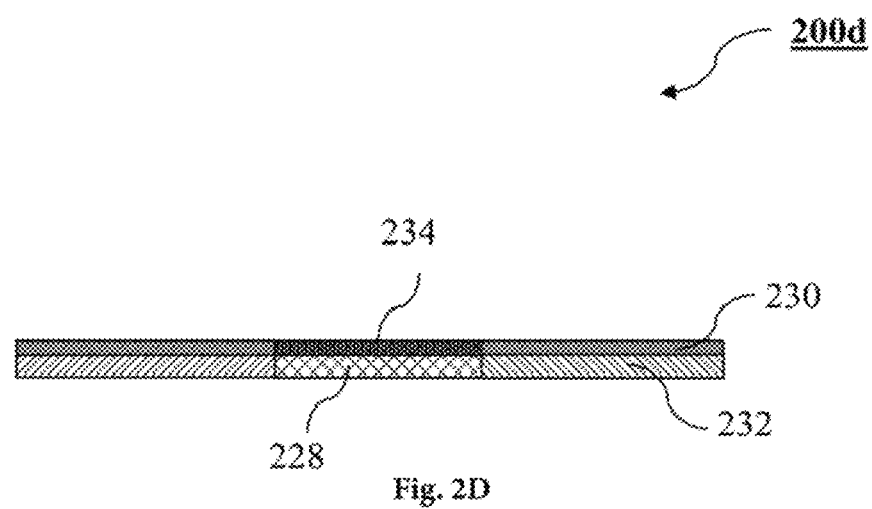
FIG. 2D shows a side view of a cover layer 200d.

FIG. 2D shows a cover layer 200d in accordance to an exemplary embodiment, which may be coupled with one side of the display layer 202. The cover layer 200d may comprise of a filter cover 228, a polarizer 230, a colour filter 232, a filter ink 234 or any combination thereof as appropriate. The colour filter 232 may be a glass consisting of red, green, blue colour pixels on a substrate, for displaying purposes. There may be more than one polarizer 230, to achieve modulation of light rays towards the display layer 202. The cover layer 200d functions primarily to keep off dust particles, and to provide colour display functions.

Filter cover 228 may be the same material as optically transparent substance 214, which may be injected or deposited into the portion 204. The optically transparent substance 214 may be a type of optical bonding glue. The filter cover 228 may also be a bandpass filtering polariser or a filtered glass, thus eliminating the treatment process for coating additional filter ink 234. A suitable type of filtered glass may be an infrared filtered glass, which has similar effects as a filtered cover coated with filter ink 234, i.e. allowing light rays from a selected electromagnetic spectrum to transmit through portion 204. More importantly, in the exemplary embodiment given, infrared filtered glass will only allow the infrared lights to pass through and block out visible light, thus darkening the area where the imaging device is located. This means that the imaging device will be hidden from a driver's view. Advantageously, this achieves a purpose of hiding the imaging device from driver's view, for aesthetic and privacy reasons.

The filter ink 234 may be a transparent ink. Depending on desired design specification, the filter ink 234 may be an infrared transparent ink possessing filtering characteristics, allowing light rays from a selected electromagnetic spectrum, and blocking out light rays with a frequency range from another electromagnetic spectrum.

A main advantage of this disclosure is flexibility of placement of an imaging device within any layer of a display unit, or external of any layer of the display unit, such that the display unit is able to transmit more than 10% of light rays through to the imaging device unobstructingly, thus improving quality of image(s) captured by the imaging device. This disclosure is suitable for indoor applications such as an interior of an automotive, where ambient light is limited. It is possible to position the imaging device at cockpit of a vehicle without using an additional camera to achieve driver's monitoring function. Since the construction of the portion 204 uses optically transparent substance 214, the transparent portion 204 achieves receiving and capturing of light rays from an ambient environment through the transparent portion. The portion 204 therefore defines a field of view (FOV) of the imaging device to observe the ambient environment.

Figure 3A:
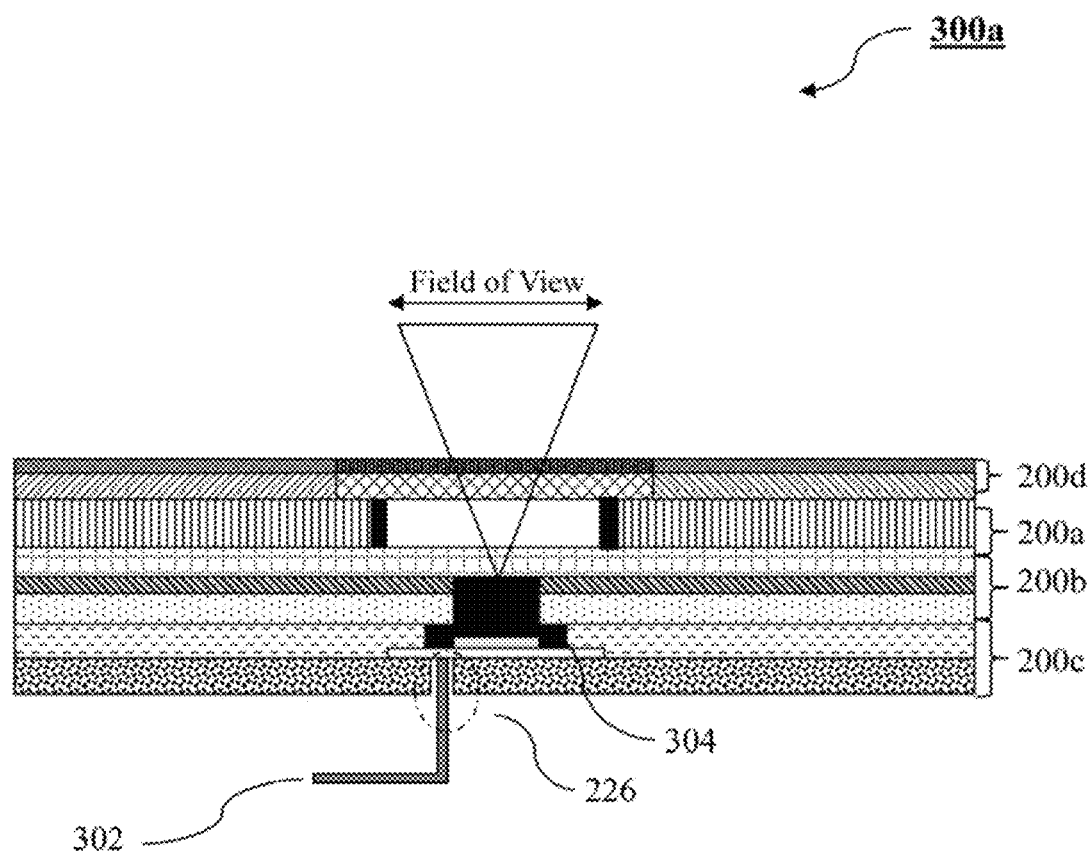
FIG. 3A shows a side view of an imaging device embedded within a display unit 300a in accordance with an exemplary embodiment.

In an exemplary embodiment as shown in FIG. 3A, an imaging device 304 is arranged within a plurality of optical layers 200b of a display unit 300a. Suitable types of imaging device 304 may be analogue imaging device or digital imaging device. The plurality of optical layers 200b may be trimmed away, thus creating a cavity 210 or a predetermined position for accommodating the imaging device 304 within the plurality of optical layers 200b. The trimming of optical layers 200b may not require specialized equipment and may therefore be more cost effective than prior art methods of cutting displays to position an imaging device. The substrate 212 does not need trimming as it is transparent. A liquid crystal layer 202 having a portion 204 comprising of an optically transparent substance 214 is coupled to one side of the plurality of optical layers layers 200b. Preferably, an aperture of the imaging device 304 shall be looking through the portion 204 unobstructingly, thanks to the trimmed optical layers 200b and the optically transparent substance 214, thereby defining a field of view (FOV) of the imaging device 304. The portion 204 comprises an optically transparent substance 214, that more than 10% of light rays passes through the portion 204 to the imaging device 304. As shown in FIG. 3A, the light source or backlight 222 receives an electrical circuitry 302 through a slit 226. A suitable form of electrical circuitry 302 may be a printed circuit board (PCB) or a flexible PCB.

Figure 3B:
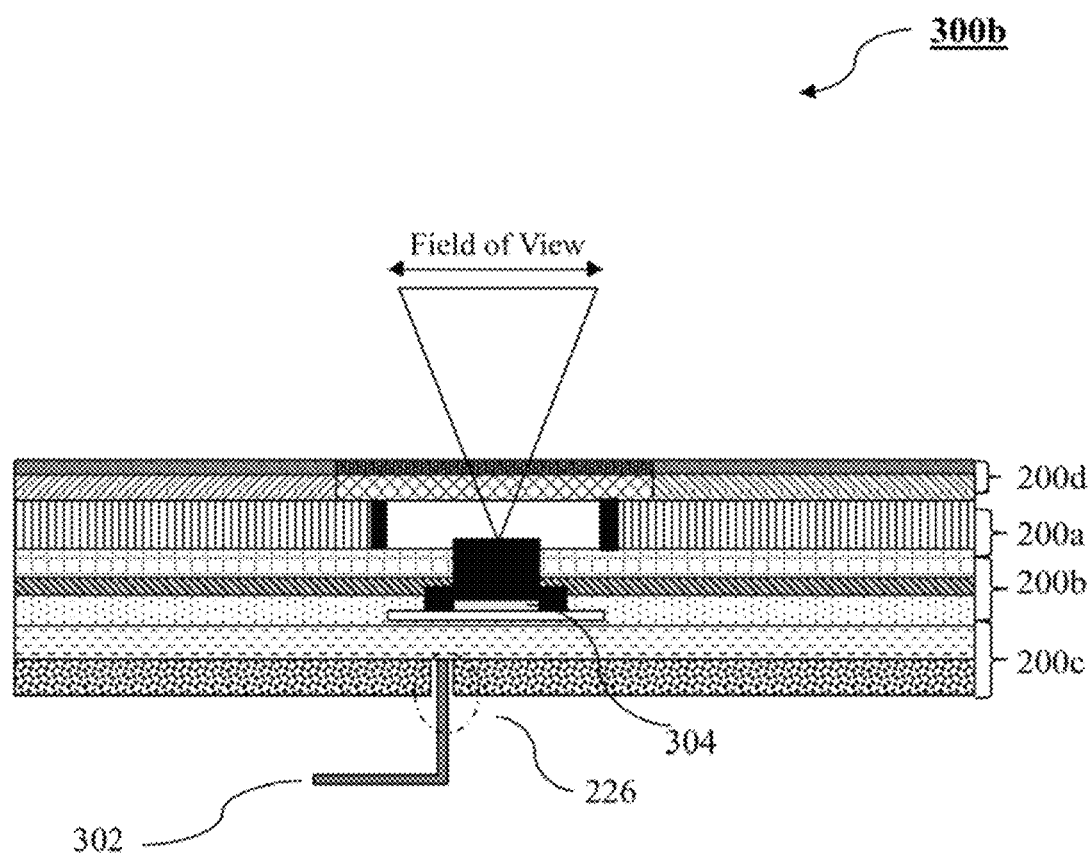
FIG. 3B shows a side view of an imaging device embedded within a display unit 300b in accordance with an exemplary embodiment.

In another exemplary embodiment as shown in FIG. 3B, the display unit 300b shows the imaging device 304 arranged such that the imaging device 304 is at least partially within the portion 204, comprising of the optically transparent substance 214. The aperture of imaging device 304 may be affixed to the portion 204 unobstructingly, defining a FOV of the imaging device 304. This allows the imaging device 304 to receive and capture light rays from the ambient environment. A suitable part will be an aperture of the imaging device 304, looking through the portion 204. The portion 204 comprises of an optically transparent substance 214, such that the optically transparent substance 214 is able to transmit more than 10% of light rays through to the imaging device unobstructingly, thus improving quality of image(s) captured by the imaging device. The plurality of optical layers 200b is coupled to one side of the liquid display layer 202 and surrounds the imaging device 304. The light source or backlight 222 receives an electrical circuitry 302 through a slit 226. A suitable form of electrical circuitry 302 may be a printed circuit board (PCB) or a flexible PCB.

Figure 3C:
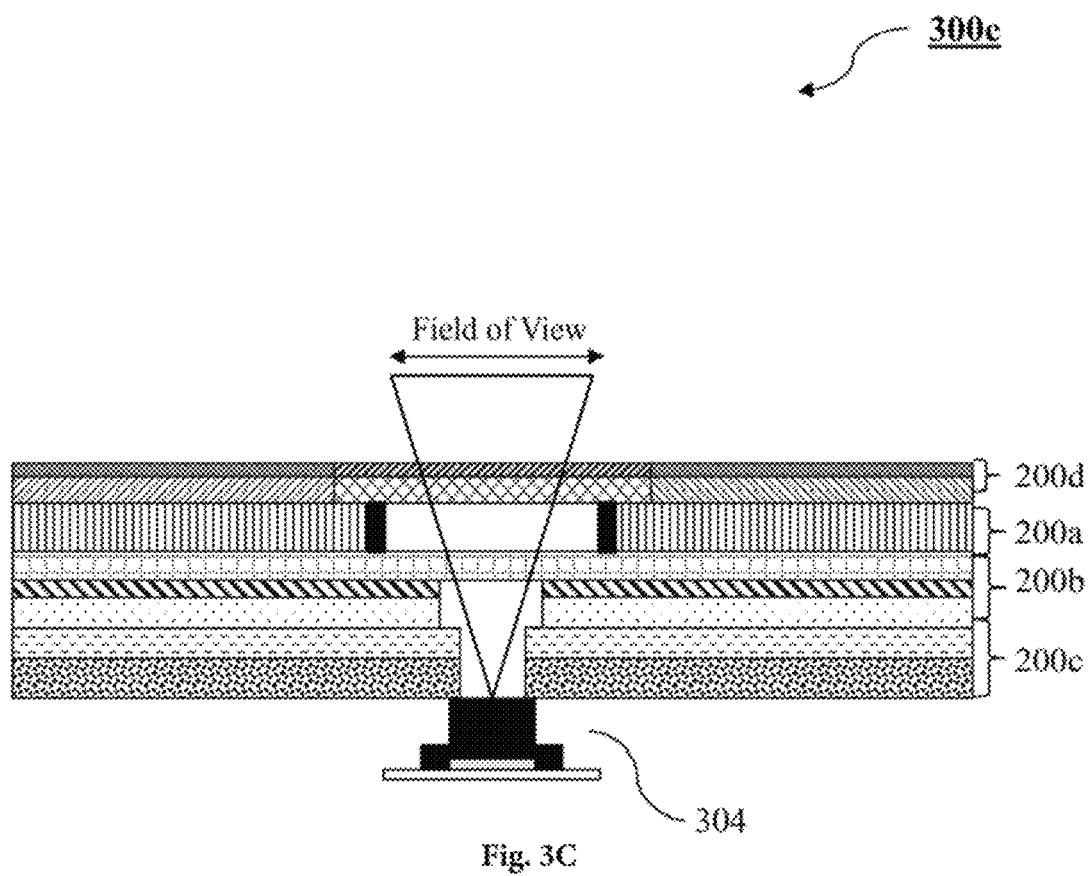
FIG. 3C shows a side view of an imaging device embedded within a display unit 300c in accordance with an exemplary embodiment.

In yet another exemplary embodiment as shown in FIG. 3C, the plurality of optical layers 200b is arranged between the liquid crystal layer 202 and the imaging device 304. Therefore, the imaging device 304 may be external to the layers of the display unit 300c. The imaging device 304 may for example, be arranged external to at least one light source 222 of the display unit. Two light sources 222 may be necessary to position the imaging device 304 external to the light source 222 of the display unit such that the aperture of the imaging device 304 is alighted to the cavity of the plurality of optical layers 200c and a portion 204 of the liquid crystal layer 202. The plurality of optical layers 200b may be trimmed away, thereby creating a cavity 210 within the plurality of optical layers 200b such that the aperture of the imaging device 304 is looking through the portion 204 unobstructingly, defining a FOV of the imaging device 304. The portion 204 comprises the optically transparent substance 214, such that the imaging device 304 is able to transmit more than 10% of light rays through to the imaging device unobstructingly.

In accordance to any one of the exemplary embodiments as described above, a cover layer 200d may be included on the top most layer. With reference to FIG. 2D, an example of a suitable type of filtered glass may be an infrared filtered glass, which allow light rays from infrared spectrum to transmit through portion 204. It shall be understood the selection of filtered glass or electromagnetic spectrum shall not depart from the scope and spirit of this disclosure.

The detailed description above serves the purpose of explaining the principles of the present disclosure and its practical application, thereby enabling others skilled in the art to understand the disclosure for various exemplary embodiments and with various modifications as are suited to the use contemplated. The detailed description is not intended to be exhaustive or to limit the present disclosure to the precise embodiments herein. Modifications and equivalents will be apparent to practitioners skilled in the relevant art and are encompassed within the scope and spirit of the appended claims.

LIST OF REFERENCE SKINS

100—Process Flowchart
102—Providing step
104—Aligning step
106—Configuring step
108 (optional)—Providing a plurality of spacers
110 (optional)—Coupling display layer with plurality of optical layers
112 (optional)—Coupling a light source with the display unit.
200a—Display module
200b—plurality of optical layers
200c—light source arrangement
200d—Cover layer
202—display layer
204—Portion
206, 206'—Spacers
210—cavity
212—substrate (TFT glass)
214—optically transparent substance
216—polarizer layer
218—optical film
220—light guide
222—light source
226—slit
228—filter cover
230—polarizer
232—colour filter
234—filter ink
300a—Display Unit with Embedded electronic device
302—electrical circuitry
304—electronic device/imaging device

The invention claimed is:

1. A display unit comprising:
a liquid crystal layer including a portion comprising an optically transparent substance injected into the liquid crystal layer;
a plurality of optical layers; and
an imaging device, wherein the imaging device is at least partially embedded within the plurality of optical layers and aligned to the portion, the portion being configured to transmit more than 10% of light rays to the imaging device, and wherein the portion does not extend through the plurality of optical layers and the optically transparent substance is different from a material of the liquid crystal layer.

2. The display unit of claim 1, wherein the optically transparent substance is configured to transmit light rays within a visible and infrared regions.

3. The display unit of claim 1, wherein the light rays transmitted have a wavelength within an infrared region.

4. The display unit of claim 1, wherein the imaging device is arranged within any layer of the display unit or external of any layer of the display unit.

5. The display unit claim 1, wherein the imaging device is arranged within the plurality of optical layers.

6. The display unit of claim 1, wherein the plurality of optical layers is arranged between the liquid crystal layer and the imaging device.

7. The display unit of claim 1, wherein the imaging device is arranged at least partially within the portion.

8. The display unit of claim 1, wherein the portion is part of the liquid crystal layer.

9. The display unit of claim 1, wherein the portion defines a field of view ("FOV") of the imaging device to observe an ambient environment.

10. The display unit of claim 1, wherein the portion defines a field of view ("FOV") of the imaging device to observe a vehicle cabin.

11. A method of assembling a display unit, the method comprising:
providing a liquid crystal layer and a plurality of optical layers;
providing a portion within the liquid crystal layer, wherein the portion does not extend through the plurality of optical layers;
aligning an imaging device to the portion; and
configuring the portion to transmit more than 10% of light rays to the imaging device by injecting an optically transparent substance different from a material of the liquid crystal layer into the liquid crystal layer such that more than 10% of light rays passes through the optically transparent substance.

12. The method of claim 11, wherein the optically transparent substance is configured to transmit light rays within a visible and infrared regions.

13. The method of claim 11, wherein the optically transparent substance is configured to transmit light rays within an infrared region.

14. The method of claim 11, further comprising placing a plurality of spacers within the liquid crystal layer, for partitioning the optically transparent substance from the liquid crystal layer.

15. The method of claim 11, wherein configuring the portion further comprises providing a cavity in the plurality of optical layers such that more than 10% of light rays passes through the cavity and the optically transparent substance.

16. The method of claim 11, wherein configuring the portion further comprises arranging the imaging device and the optically transparent substance entirely within the portion such that more than 10% of light rays passes through the optically transparent substance.

* * * * *